(12) United States Patent
Brown et al.

(10) Patent No.: US 8,314,037 B2
(45) Date of Patent: Nov. 20, 2012

(54) FLUOROPOLYMER EMULSIONS

(75) Inventors: Gerald Oronde Brown, Wilmington, DE (US); Peter Michael Murphy, Chadds Ford, PA (US); Ying Wang, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 800 days.

(21) Appl. No.: 12/268,470

(22) Filed: Nov. 11, 2008

(65) Prior Publication Data

US 2009/0149096 A1 Jun. 11, 2009

Related U.S. Application Data

(60) Provisional application No. 61/005,744, filed on Dec. 7, 2007.

(51) Int. Cl.
```
B32B 5/02      (2006.01)
B32B 27/00     (2006.01)
C08F 18/20     (2006.01)
A01K 1/015     (2006.01)
```

(52) U.S. Cl. ......... 442/80; 428/221; 428/421; 526/245; 526/246

(58) Field of Classification Search ................... None
See application file for complete search history.

(56) References Cited

U.S. PATENT DOCUMENTS

| | | | |
|---|---|---|---|
| 3,282,905 A | 11/1966 | Fasick et al. | |
| 3,592,679 A | 7/1971 | Tully et al. | |
| 3,890,376 A | 6/1975 | Jager | |
| 3,979,469 A | 9/1976 | Jager | |
| 4,983,459 A | 1/1991 | Franz et al. | |
| 5,308,705 A | 5/1994 | Franz et al. | |
| 5,370,919 A | 12/1994 | Fleuws et al. | |
| 5,481,028 A | 1/1996 | Petrov et al. | |
| 5,712,335 A | 1/1998 | Tsuda et al. | |
| 5,888,290 A | 3/1999 | Engle et al. | |
| 5,908,663 A | 6/1999 | Wang et al. | |
| 6,653,511 B2 | 11/2003 | Howell et al. | |
| 7,037,966 B2 | 5/2006 | Zheng et al. | |
| 2005/0095933 A1 | 5/2005 | Kimbrell et al. | |
| 2006/0134439 A1* | 6/2006 | Yamamoto et al. ........... 428/447 |
| 2006/0173121 A1 | 8/2006 | Tamai | |
| 2006/0216524 A1 | 9/2006 | Klun et al. | |
| 2006/0281828 A1 | 12/2006 | Nakayama et al. | |
| 2006/0287559 A1 | 12/2006 | Friesen et al. | |
| 2007/0049676 A1 | 3/2007 | Wu et al. | |
| 2008/0000883 A1 | 1/2008 | Rudolf et al. | |
| 2008/0090088 A1 | 4/2008 | Deruelle et al. | |

FOREIGN PATENT DOCUMENTS

| | | |
|---|---|---|
| CN | 1690142 | 11/2005 |
| EP | 1632542 A1 | 3/2006 |
| EP | 1767547 A | 3/2007 |
| JP | 03244996 | 10/1991 |
| JP | 08269367 | 10/1996 |
| JP | 09296134 | 11/1997 |
| JP | 2000264948 | 9/2000 |
| JP | 2003128991 | 5/2003 |
| JP | 2003147340 | 5/2003 |
| JP | 2005097369 | 4/2005 |
| JP | 2005208290 | 8/2005 |
| JP | 2006219657 | 8/2006 |
| JP | 2006348117 | 12/2006 |
| JP | 2007031712 | 2/2007 |
| JP | 2007070551 | 3/2007 |
| WO | 9511877 | 5/1995 |
| WO | 2006/045713 A | 5/2006 |
| WO | 2006051634 | 5/2006 |
| WO | 2006051833 | 5/2006 |
| WO | 2006051835 | 5/2006 |
| WO | 2006061835 | 6/2006 |
| WO | 2006093748 | 9/2006 |

OTHER PUBLICATIONS

Balague et al., Synthesis of fluorinated telomers. Part 1. Telomerization of vinylidene fluoride with perfluoroalkyl iodides, Journal of fluorine Chemistry (1995), 70(2), 215-223, Elsevier Science S.A.

Naud et al., Synthesis of terminally perfluorinated long-chain alkanethiols, sulfides and disulfides from the corresponding halides, Journal of Fluorine Chemistry, (2000), 104(2), 173-183, Elsevier Science S.A.

Jung et al., Perfluorinated polymer monolayers on porous silica for materials with super liquid repellent properties, Langmuir (2002), 18(16), 6133-6139, American Chemical Society.

Sawada et al., Synthesis and applications of novel fluoroalkyl end-capped oligomers/silica gel polymer hybrids, International Journal of Polymeric Materials (2005), 54(4), 305-310, Taylor & Francis, Inc.

Sawada et al., Synthesis and applications of novel fluoroalkyl end-capped oligomers containing 3,5-dimethyl-4-hydroxybenzyl and 3-(2H-benzotriazol-2-yl)-4-hydroxyphenyl segments, International Journal of Polymeric Materials (2005), 54(4), 311-332, Taylor & Francis, Inc.

Sawada et al., Synthesis of self-assembled fluoroalkyl end-capped oligomeric aggregates—Applications of these aggregates to fluorinated oligomeric nanocomposites, Progress in Polymer Science (2007), 32(5), 509-533, Elsevier Ltd.

* cited by examiner

*Primary Examiner* — Camie Thompson
(74) *Attorney, Agent, or Firm* — Erik W. Percz

(57) ABSTRACT

A fluoropolymer composition comprising monomers copolymerized in the following percentages by weight:
- (a) from about 20% to about 95% of a fluoroalkyl monomer, or mixture of monomers,
- (b) from about 5% to about 80% of at least one of:
  - (i) an alkyl (meth)acrylate monomer having a linear, branched or cyclic alkyl group of from about 6 to about 18 carbons; or
  - (ii) one or more ionizable water solvatable monomers; and
- (c) from about 0.05% to about 2% non-fluorinated polymerizable nanoparticles.

17 Claims, No Drawings

FLUOROPOLYMER EMULSIONS

FIELD OF INVENTION

This invention relates to a composition comprising a fluorinated copolymer emulsion containing non-fluorinated particles useful for imparting oil repellency and water repellency to textiles, the copolymer derived from polymerization of monomers comprising fluorinated acrylates, alkyl (meth)acrylates and/or water solvatable monomers, and polymerizable nanoparticles.

BACKGROUND OF THE INVENTION

Various compositions are known to be useful as treating agents to provide surface effects to substrates. Surface effects include repellency to moisture, soil, and stains, and other effects, which are particularly useful for fibrous substrates such as fibers, fabrics, textiles, carpets, paper, leather, and other such substrates. Many such treating agents are fluorinated polymers or copolymers.

Fluorinated polymer compositions having utility as fibrous substrate treating agents generally contain pendant perfluoroalkyl groups which are generally attached by various connecting groups to polymerizable groups not containing fluorine. The resulting monomer is then generally copolymerized with other monomers, which confer additional favorable properties to the substrates. Various specialized monomers may be incorporated to impart improved cross-linking, latex stability and substantively. Since each ingredient may impart some potentially undesirable properties in addition to its desirable ones, the specific combination is directed to the desired use.

U.S. Patent Application 2005/0095933 discloses compositions for treating textiles formed by combining a repellent component, a stain resist component, a stain release component, and particles. Various commercially available fluorinated polymers are employed as the repellent component and the particles are inorganic oxides or basic metal salts. The fluorinated polymers and particles are separately added to a solution, and thus represent a mixture of the polymer and particle, which is applied to the substrate to be treated.

The expense of the fluorinated polymer dictates that it be used at lower levels in treating substrates to provide surface effects. However, reducing the level of fluorine by using polymers containing shorter chained perfluoroalkyl groups of six carbons or less has not been commercially successful. Thus there is a need for compositions for treating substrates which impart surface effects including water repellency, oil repellency, soil resistance, soil release, stain resistance and stain release, and other effects, which maintain levels of performance, while using less of the expensive fluorinated component. The present invention provides such a composition.

SUMMARY OF INVENTION

The present invention comprises a fluoropolymer composition comprising monomers copolymerized in the following percentages by weight:

(a) from about 20% to about 95% of a fluoroalkyl monomer, or mixture of monomers, of formula (I)

$$R_f^1\text{-L-X—C(O)—C(R)=CH}_2 \quad (I)$$

wherein $R_f^1$ is a monovalent, partially or fully fluorinated, linear or branched, alkyl radical having from about 2 to about 100 carbon atoms; optionally interrupted by 1 to about 50 oxygen atoms; wherein the ratio of carbon atoms to oxygen atoms is at least about 2:1 and no oxygen atoms are bonded to each other;

L is a bond or a linear or branched divalent linking group having 1 to about 20 carbon atoms, said linking group optionally interrupted by 1 to about 4 hetero-radicals selected from the group consisting of —O—, —NR$^1$—, —S—, —SO—, —SO$_2$—, and —N(R$^1$)C(O)— wherein R$^1$ is H or C$_1$ to C$_6$ alkyl, and said linking group optionally substituted with CH$_2$Cl;

X is —O—, —NR$^1$—, or —S—;

R is hydrogen, Cl, F or CH$_3$;

(b) from about 5% to about 80% of at least one of:
(i) an alkyl (meth)acrylate monomer having a linear, branched or cyclic alkyl group of from about 6 to about 18 carbons; or
(ii) one or more ionizable water solvatable monomers; and (c) from about 0.05% to about 2% non-fluorinated polymerizable nanoparticles, said composition providing oil repellency and water repellency to substrates contacted therewith.

The present invention further comprises a method of treating a fibrous substrate to impart oil repellency and water repellency comprising applying to the surface of the substrate a fluoropolymer as described above.

The present invention further comprises a fibrous substrate having applied to its surface an emulsion polymer as disclosed above.

DETAILED DESCRIPTION OF INVENTION

Herein all trademarks are designated with capital letters.

The term "(meth)acrylate" encompasses esters of methacrylic acid and acrylic acid unless specifically stated otherwise. For instance, hexyl (meth)acrylate encompasses both hexyl acrylate and hexyl methacrylate.

All patents cited herein are hereby incorporated by reference.

Herein the terms "fluorinated acrylate(s)" "fluorinated thioacrylate(s)" and "fluorinated acrylamide(s)" refer to compounds of formula (Ia), (Ib), (Ic), (Id), and (Ie) as described below, wherein R is selected from the group consisting of H, Cl, F, and CH$_3$, unless specifically defined otherwise.

The present invention provides compositions for imparting surface effects to substrates in which fluorinated polymers have particles incorporated during the polymerization reaction used to form the polymers. Thus the particles are part of the polymer chemical structure. The particles have reactive functionalities on their surfaces, are not fluorinated, and are reacted during polymerization in the synthesis of either solution based or emulsion based fluorinated polymers. The resulting composition provides enhanced performance and durability of surface effects to treated substrates compared to traditional commercially available treatment agents not containing particles, or compared to compositions wherein treatment agents are physically mixed with particles in a treatment bath prior to application. It has been found that incorporation of small amounts as low as 0.1% by weight of a particle into the polymer structure is effective to enhance performance. Preferably from about 0.1% to about 5% by weight, more preferably from about 0.1% to about 3% by weight, and more preferably from about 0.1% to about 1% by weight, of the particle component is incorporated into the polymer. This invention permits use of lower amounts of traditional treatment agents, or use of agents containing short perfluoroalkyl chains of less than 8 carbon atoms (and thus containing less fluorine) without any decrease in performance.

The composition of the present invention comprises a fluoropolymer composition comprising monomers copolymerized in the following percentages by weight:

(a) from about 20% to about 95% of a fluoroalkyl monomer, or mixture of monomers, of formula (I)

wherein
$R_f^1$ is a monovalent, partially or fully fluorinated, linear or branched, alkyl radical having from about 2 to about 100 carbon atoms; optionally interrupted by methylene, ethylene, or 1 to about 50 oxygen atoms; wherein the ratio of carbon atoms to oxygen atoms is at least about 2:1 and no oxygen atoms are bonded to each other;

L is a bond or a linear or branched divalent linking group having 1 to about 20 carbon atoms, said linking group optionally interrupted by 1 to about 4 hetero-radicals selected from the group consisting of —O—, —NR$^1$—, —S—, —SO—, —SO$_2$—, and —N(R$^1$)C(O)— wherein R$^1$ is H or C$_1$ to C$_6$ alkyl, and said linking group optionally substituted with CH$_2$Cl;

X is —O—, —NR$^1$—, or —S—;
R is hydrogen, Cl, F or CH$_3$;

(b) from about 5% to about 80% of at least one of:
(iii) an alkyl (meth)acrylate monomer having a linear, branched or cyclic alkyl group of from about 6 to about 18 carbons; or
(iv) one or more ionizable water solvatable monomers; and (c) from about 0.05% to about 2% non-fluorinated polymerizable nanoparticles, said composition providing oil repellency and water repellency to substrates contacted therewith.

The compositions of the present invention are prepared by copolymerizing (a) a fluoroalkyl monomer, (b) an alkyl (meth)acrylate monomer or an ionizable water solvatable monomer, and (c) a polymerizable nanoparticle.

The copolymer compositions require as component (a) a fluoroalkyl monomer of formula (I)

wherein the various groups $R_f^1$, L, X and R are as defined above.

Preferred $R_f^1$ groups include F(CF$_2$)$_n$, F(CF$_2$)$_n$(CH$_2$CF$_2$)$_p$, F(CF$_2$)$_n$(CH$_2$)$_x$[(CF$_2$CF$_2$)$_p$(CH$_2$CH$_2$)$_q$]$_m$, F(CF$_2$)$_n$O(CF$_2$)$_n$, F(CF$_2$)$_n$OCFHCF$_2$, or F(CF$_2$)$_n$[OCF$_2$CF(CF$_3$)]$_p$[OCF$_2$CF$_2$]$_q$, wherein n is 1 to about 6; x is 1 to about 6; and p, q, and m are each independently 1 to about 3.

Preferably L is a bond or a linking group -(L$^1$)$_p$-; wherein p is an integer of 1 to 4, and L$^1$ is selected from the group consisting of —(C$_t$H$_{2t}$)— wherein t is an integer of 1 to 10; phenylene; C$_1$-C$_4$ alkyl substituted phenylene; ethylene oxide; R$^5$; and (A)$_p$-R$^5$; wherein A is a divalent alkyl of 1 to 6 carbons, p is as defined above, and R$^5$ is a divalent radical selected from the group consisting of —S(CH$_2$)$_u$—,

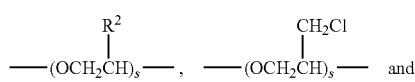

u is an integer of from about 2 to about 4;
s is an integer of 1 to about 50; and
R$^2$, R$^3$, and R$^4$ are each independently hydrogen or an alkyl group containing 1 to about 6 carbon atoms. More preferably L is a bond; —(C$_t$H$_{2t}$)—(R$^5$)$_r$— wherein t is an integer of 1 to 10 and r is 0 or 1; —(R$^5$)$_r$— wherein r is 1; or (OCH$_2$CH2)$_v$ wherein v is 2 to 4.

Preferably the monomers (I) are selected from the group consisting of formulas (Ia), (Ib), (Ic), (Id), and (Ie):

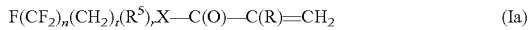  (Ia)

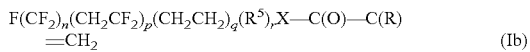  (Ib)

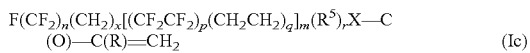  (Ic)

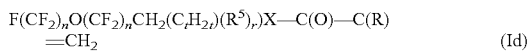  (Id)

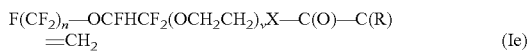  (Ie)

wherein
X is —O—, —NR$^1$—; or —S—;
n is an integer of 1 to about 6;
t is an integer of 1 to about 10;
x is an integer of 1 to about 6;
p, q, and m are each independently an integer of 1 to about 3;
r is 0 or 1;
v is an integer of 1 to about 4;
R$^5$ is a divalent radical selected from the group consisting of —S(CH$_2$)$_u$—,

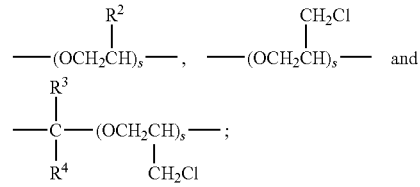

u is an integer of from about 2 to about 4;
s is an integer of 1 to about 50; and
R$^2$, R$^3$, and R$^4$ are each independently hydrogen or an alkyl group containing 1 to about 6 carbon atoms.

The fluorinated acrylates and fluorinated thioacrylates of formula (Ia), (Ib), (Ic), (Id), and (Ie) useful in forming the compositions of the invention are prepared from the corresponding fluorinated alcohols and fluorinated thiols by esterification with acrylic acid, methacrylic acid, 2-chloroacrylic acid or 2-fluoroacrylic acid. Further details are described in U.S. Pat. No. 3,282,905 and European Patent Application 1632542 A1. Alternatively, acrylate and methacrylate esters of formula (Ia), (Ib), (Ic), (Id), and (Ie) can be made from the corresponding nitrate esters according to the procedures disclosed in U.S. Pat. No. 3,890,376.

The fluorinated acrylamides of formula (Ia), (Ib), (Ic), (Id), and (Ie), wherein X=—N(R)— useful in forming the compositions of the invention, are prepared from the corresponding fluorinated amines by condensation with acrylic acid chloride, methacrylic acid chloride, 2-chloroacrylic acid chloride or 2-fluoroacrylic acid chloride in the presence of a base, for instance, triethylamine (TEA). Typically a nonhydroxylic hydrocarbon solvent such as toluene or xylenes or a halocarbon such as dichloromethane is used in the condensation.

Fluorinated alcohols useful in forming the fluorinated acrylates of formula (1) suitable for use in the present invention include those of formulas (IIIa), (IIIb), (IIIc), and (IIId):

$$F(CF_2)_n(CH_2)_tOH \quad \text{(IIIa)}$$

$$F(CF_2)_n(CH_2CF_2)_p(CH_2CH_2)_qOH \quad \text{(IIIb)}$$

$$F(CF_2)_nO(CF_2CF_2)_p(CH_2CH_2)_qOH \quad \text{(IIIc)}$$

$$F(CF_2)_nO(CF_2)_nCH_2(C_tH_{2t})OH \quad \text{(IIId)}$$

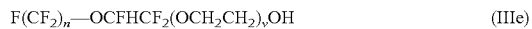

$$F(CF_2)_n\text{—}OCFHCF_2(OCH_2CH_2)_vOH \quad \text{(IIIe)}$$

wherein
n, p, q, t, and v are as disclosed above.

In formula (IIIa) the perfluoroalkyl group preferably is linear, although compositions containing branched-chain perfluoroalkyl groups are suitable. Fluorinated alcohols of formula (IIIa) useful in the invention are available from E.I. du Pont de Nemours and Company, Wilmington, Del. 19898 USA. A mixture of fluorinated alcohols can be used in the formation of acrylates of formula (Ia). For instance, a perfluoroalkylethyl alcohol mixture of the formula $F(CF_2)_hCH_2CH_2OH$, wherein h ranges from 6 to 14, and is predominately 6, 8, and 10; or a purified fraction can be used. The perfluoroalkylethanols of formula (IIIa), wherein t is 2, and n is 4 or 6, are available by fractional distillation of the commercially available telomer mixture of perfluoroalkylethanols. Specific fluorinated alcohols of formula (IIIa) that are commercially available include 1H,1H,2H,2H-perfluoro-1-hexanol, 1H,1H,-perfluoro-1-hexanol, and 1H,1H,2H,2H-perfluoro-1-octanol.

Fluorinated telomer alcohols of formula (IIIb), wherein $R_f^3$ is a linear or branched perfluoroalkyl group having 1 to 6 carbon atoms, are available by synthesis according to Scheme 1.

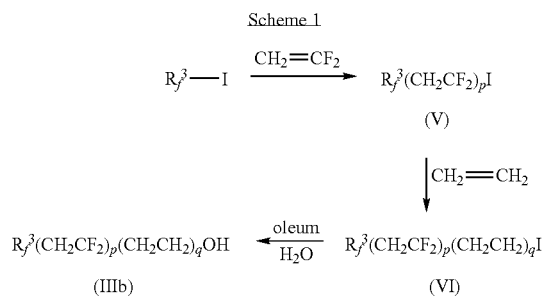

Scheme 1

The telomerization of vinylidene fluoride (VDF) with linear or branched perfluoroalkyl iodides is well known, and produces compounds of the structure $R_f^3(CH_2CF_2)_qI$, wherein p is 1 or more and $R_f^3$ is a $C_1$ to $C_6$, and preferably a $C_4$ to $C_6$, perfluoroalkyl group. For example, see Balague, et al, "Synthesis of fluorinated telomers, Part 1, Telomerization of vinylidene fluoride with perfluoroalkyl iodides", J. Flour Chem. (1995), 70(2), 215-23. The specific telomer iodides are isolated by fractional distillation. The telomer iodides can be treated with ethylene by procedures described in U.S. Pat. No. 3,979,469, to provide the telomer ethylene iodides (VI) wherein q is 1 to 3 or more. The telomer ethylene iodides (VI) can be treated with oleum and hydrolyzed to provide the corresponding telomer alcohols (IIIb) according to procedures disclosed in WO 95/11877. Alternatively, the telomer ethylene iodides (VI) can be treated with N-methyl formamide followed by ethyl alcohol/acid hydrolysis.

Specific fluorinated telomer alcohols (IIIa), and (IIIb) derived from telomerization of vinylidene fluoride and ethylene, and useful in forming fluorinated acrylates useful in the invention include those listed in Table 1A. The groups $C_3F_7$, $C_4F_9$, and $C_6F_{13}$, referred to in the list of specific alcohols, in Tables 1A and 1B, and in the examples herein, refer to linear perfluoroalkyl groups unless specifically indicated otherwise.

TABLE 1A

| Compound | Structure |
|---|---|
| A1 | $C_4F_9CH_2CH_2OH$, |
| A2 | $C_4F_9(CH_2CH_2)_2OH$, |
| A3 | $C_6F_{13}CH_2CH_2OH$, |
| A4 | $C_6F_{13}(CH_2CH_2)_2OH$, |
| A5 | $C_6F_{13}(CH_2CH_2)_3OH$, |
| A6 | $C_4F_9CH_2CF_2CH_2CH_2OH$, |
| A7 | $C_4F_9(CH_2CF_2)_2CH_2CH_2OH$, |
| A8 | $C_4F_9(CH_2CF_2)_3CH_2CH_2OH$, |
| A9 | $C_4F_9CH_2CF_2(CH_2CH_2)_2OH$, |
| A10 | $C_4F_9(CH_2CF_2)_2(CH_2CH_2)_2OH$, |
| A11 | $C_6F_{13}CH_2CF_2CH_2CH_2OH$, |
| A12 | $C_6F_{13}(CH_2CF_2)_2CH_2CH_2OH$, |
| A13 | $C_6F_{13}(CH_2CF_2)_3CH_2CH_2OH$, |
| A14 | $C_6F_{13}CH_2CF_2(CH_2CH_2)_2OH$, |
| A15 | $C_6F_{13}(CH_2CF_2)_2(CH_2CH_2)_2OH$. |

Fluorinated alcohols of formula (IIIc), wherein p is 1 and $R_f^3$ is a linear or branched perfluoroalkyl group having 1 to 6 carbon atoms are available by synthesis according to Scheme 2.

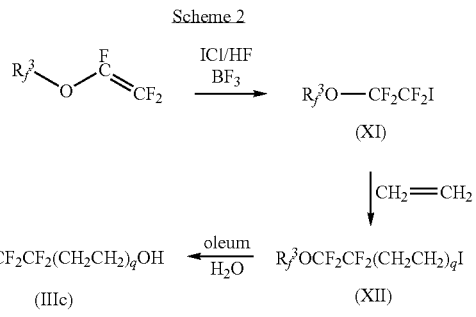

Scheme 2

The perfluoroalkyl ether iodides (XI) are made by the procedure described in Example 8 of U.S. Pat. No. 5,481,028, using perfluoroalkyl vinyl ethers as a starting point. In the second reaction in Scheme 2, the perfluoroalkyl ether iodide (XI) is reacted with an excess of ethylene at an elevated temperature and pressure to provide telomer ethyl iodide (XII). While the addition of ethylene can be carried out thermally, the use of a suitable catalyst is preferred. Preferably the catalyst is a peroxide catalyst such as benzoyl peroxide, isobutyroyl peroxide, propionyl peroxide, or acetyl peroxide. More preferably the peroxide catalyst is benzoyl peroxide. The temperature of the reaction is not limited, but a temperature in the range of 110° C. to 130° C. is preferred. The reaction time may vary with the catalyst and reaction conditions, but we have found 24 hours (h) to be adequate. The product can be purified by any means that separates unreacted starting material from the final product, but distillation is preferred. Satisfactory yields up to 80% of theory have been obtained using about 2.7 mols of ethylene per mole of perfluoalkyl ether iodide, a temperature of 110° C. and autogenous pressure, a reaction time of 24 h, and purifying the product by distillation. The perfluoroalkylether ethyl iodides (XII) can be treated with oleum and hydrolyzed to provide the corresponding alcohols (IIIc) according to procedures disclosed in WO 95/11877. Alternatively, the perfluoroalkylether ethyl iodides can be treated with N-methyl formamide followed by ethyl alcohol/acid hydrolysis.

The higher homologs of (IIIc) wherein p is 2 or 3 are available by telomerization of tetrafluoroethylene with the perfluoroalkyl ether iodides (XI) wherein p is 1, followed by isolation of specific telomers by distillation, and then telomerization with ethylene. The higher homologs (q is 2 or 3) of telomer ethylene iodides are available with excess ethylene at high pressure.

Specific fluorinated alcohols (IIIc) useful in forming fluorinated acrylates useful in the invention include those listed in Table 1B

TABLE 1B

| Compound | Structure |
|---|---|
| B1 | $C_2F_5OCF_2CF_2CH_2CH_2OH$, |
| B2 | $C_2F_5O(CF_2CF_2)_2CH_2CH_2OH$, |
| B3 | $C_3F_7OCF_2CF_2CH_2CH_2OH$, |
| B4 | $C_3F_7O(CF_2CF_2)_2CH_2CH_2OH$, |
| B5 | $C_4F_9OCF_2CF_2CH_2CH_2OH$, |
| B6 | $C_4F_9O(CF_2CF_2)_2CH_2CH_2OH$, |
| B7 | $C_6F_{13}OCF_2CF_2CH_2CH_2OH$, |
| B8 | $C_6F_{13}O(CF_2CF_2)_2CH_2CH_2OH$, |

The corresponding thiols of alcohols (IIIa) (IIIb) and (IIIc) are available from the telomer ethylene iodides by treatment with a variety of reagents according to procedures described in J. Fluorine Chemistry, 104, 2 173-183 (2000). One example is the reaction of the telomer ethylene iodides with sodium thioacetate, followed by hydrolysis, as shown in the following scheme:

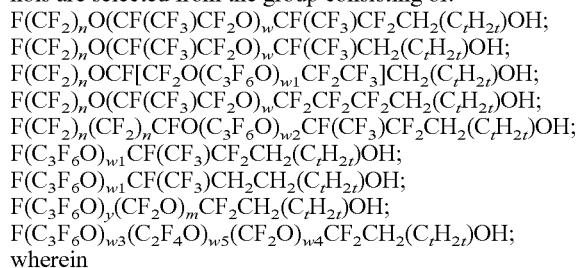

In fluoroalcohols of formula (IIId) the perfluoroalkyl group is a perfluoroalkylether. Preferred perfluoroalkyl ether alcohols are selected from the group consisting of:
$F(CF_2)_nO(CF(CF_3)CF_2O)_wCF(CF_3)CF_2CH_2(C_tH_{2t})OH$;
$F(CF_2)_nO(CF(CF_3)CF_2O)_wCF(CF_3)CH_2(C_tH_{2t})OH$;
$F(CF_2)_nOCF[CF_2O(C_3F_6O)_{w1}CF_2CF_3]CH_2(C_tH_{2t})OH$;
$F(CF_2)_nO(CF(CF_3)CF_2O)_wCF_2CF_2CF_2CH_2(C_tH_{2t})OH$;
$F(CF_2)_n(CF_2)_nCFO(C_3F_6O)_{w2}CF(CF_3)CF_2CH_2(C_tH_{2t})OH$;
$F(C_3F_6O)_{w1}CF(CF_3)CF_2CH_2(C_tH_{2t})OH$;
$F(C_3F_6O)_{w1}CF(CF_3)CH_2CH_2(C_tH_{2t})OH$;
$F(C_3F_6O)_y(CF_2O)_mCF_2CH_2(C_tH_{2t})OH$;
$F(C_3F_6O)_{w3}(C_2F_4O)_{w5}(CF_2O)_{w4}CF_2CH_2(C_tH_{2t})OH$;
wherein
t is an integer of 1 to about 10;
w, w1, w2, w3, w4, and w5 are each independently an integer from 2 to about 25; and
$C_3F_6O$ is linear or branched.

The perfluoropolyether alkyl alcohols of formula (IIId), useful in the invention, have an average molecular weight of about 350 to about 5000, preferably about 1000 to about 2000; and more preferably about 1500 to about 2000. U.S. Pat. No. 6,653,511, incorporated herein by reference; and US 2006/0287559 disclose synthetic methods useful in preparing the alcohols of formula (IIId). Other lower molecular weight perfluoroalkylether alcohols for preparing acrylates useful in compositions of the invention are B9 to B14:
B9 $CF_3OCF(CF_3)CF_2OCF_2CF_2CH_2CH_2OH$,
B10 $CF_3OCF(CF_3)CF_2O(CF_2CF_2)_2CH_2CH_2OH$,
B11 $C_2F_5OCF(CF_3)CF_2OCF_2CF_2CH_2CH_2OH$,
B12 $C_2F_5OCF(CF_3)CF_2O(CF_2CF_2)_2CH_2CH_2OH$,
B13 $C_3F_7OCF(CF_3)CF_2OCF_2CF_2CH_2CH_2OH$,
B14 $C_3F_7OCF(CF_3)CF_2O(CF_2CF_2)_2CHCH_2CH_2OH$, The fluoroalcohols of formula (IIIe), used to make composition of the present invention are available from the following reaction:

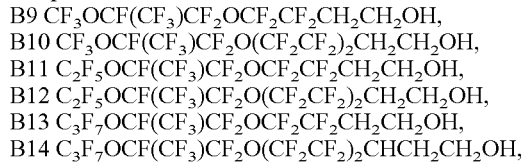

wherein
$F(CF_2)_n$ is a $C_1$ to $C_6$ linear or branched chain perfluoroalkyl group; and
v is 1 to about 4, preferably from 1 to 2, more preferably 2.
Preferred compounds of Formula (IIIe) are those wherein c is 3 or 4, g is 2, and v is 1 or 2.

Compounds of formula (IIIe) are prepared by the reaction of a perfluoroalkyl vinyl ether with a diol in the presence of an alkali metal compound. Preferred ethers include those of formula $F(CF_2)_n$—O—CF═$CF_2$ wherein n is one to six carbons. Preferred diols include diethylene glycol. The diol is used at about 1 to about 15 mols per mol of ether, preferably from about 1 to about 5 mols per mol of ether. Suitable alkali metal compounds include an alkali metal, alkali earth metal, alkali hydroxide, alkali hydride, or an alkali amide. Preferred are alkali metals such as Na, K or Cs or alkali hydrides such as NaH or KH. The reaction is conducted at a temperature of from about ambient temperature to about 120° C., preferably from about 40° C. to about 120° C. The reaction can be conducted in an optional solvent, such as ether or nitrile.

One preferred embodiment is a composition of the invention, as disclosed above, wherein formula (I) is formula (Ia); further wherein $F(CF_2)_n$ is $C_4$ to $C_6$ perfluoroalkyl group, and further wherein X═—O—.

Another preferred embodiment is a composition of the invention, as disclosed above, wherein formula (I) is formula (Ib); preferably wherein $F(CF_2)_n$ is $C_4$ to $C_6$ perfluoroalkyl group; more preferably wherein p and q are 1; and more preferably wherein X is —O—.

Another preferred embodiment is a composition of the invention, as disclosed above, wherein formula (I) is formula (Ic); preferably wherein $F(CF_2)_n$ is $C_4$ to $C_6$ perfluoroalkyl group; more preferably wherein p and q are 1; and more preferably wherein X is —O—.

Another preferred embodiment is a composition of the invention, as disclosed above, wherein formula (I) is formula (Id); and further wherein subscript n is 2 to 6; and preferably wherein X is —O—.

Another preferred embodiment is a composition of the invention, as disclosed above, wherein formula (I) is formula (Ie); and further wherein $F(CF_2)_n$ is $C_4$ to $C_6$ perfluoroalkylether group; and preferably wherein X is —O—.

The fluoroalkyl monomer is copolymerized with an alkyl (meth)acrylate monomer or a water solvatable monomer. Component (b) (i) is herein defined as one or more alkyl (meth)acrylates wherein said alkyl is a linear, cyclic or branched hydrocarbon having 6 to 18 carbons. Specific monomers useful in component (b) include stearyl (meth)

acrylate, lauryl (meth)acrylate, 2-ethylhexyl (meth)acrylate, tridecyl (meth)acrylate, hexyl (meth)acrylate, cyclohexyl (meth)acrylate, and others. Preferred monomers are stearyl (meth)acrylate, 2-ethylhexyl (meth)acrylate, hexyl (meth) acrylate, cyclohexyl (meth)acrylate, lauryl (meth)acrylate, tridecyl (meth)acrylate, or a mixture thereof. Of the foregoing, stearyl acrylate and stearyl methacrylate are most preferred. Such monomers are commercially available.

Component (b)(ii), the ionizable water solvatable monomers, useful in preparing the fluoropolymer compositions of the invention are ethylenically unsaturated monomers, having an ionizable group such as a carboxylic acid, phosphate, sulfonate, sulfinate, or metal salt thereof; and nitrogen bases such as primary, secondary, and tertiary amine bases, and aromatic amine bases such as pyridine derivatives, wherein the nitrogen is from about 40% to 100% salinized. By "salinized" is meant that the nitrogen is protonated, alkylated with a linear or branched alkyl or arylalkyl group, for instance benzyl, having 1 to 20 carbon atoms; or a combination thereof.

Preferred ionizable water solvatable monomer(s) of component (b)(ii) are selected from the group consisting of formula (IIa) through (IIh):

$$M^1OC(O)—C(R)\!=\!CH_2 \quad (IIa)$$

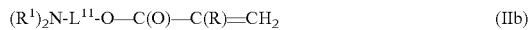

$$(R^1)_2N\text{-}L^{11}\text{-}O—C(O)—C(R)\!=\!CH_2 \quad (IIb)$$

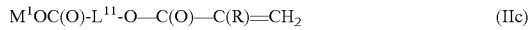

$$M^1OC(O)\text{-}L^{11}\text{-}O—C(O)—C(R)\!=\!CH_2 \quad (IIc)$$

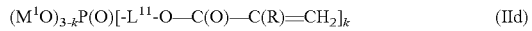

$$(M^1O)_{3-k}P(O)[\text{-}L^{11}\text{-}O—C(O)—C(R)\!=\!CH_2]_k \quad (IId)$$

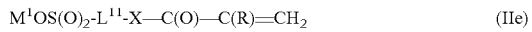

$$M^1OS(O)_2\text{-}L^{11}\text{-}X—C(O)—C(R)\!=\!CH_2 \quad (IIe)$$

$$M^1OS(O)_2\text{-}L^{11}\text{-}C(R)\!=\!CH_2 \quad (IIf)$$

$$M^1OS(O)_2—C(R)\!=\!CH_2 \quad (IIg)$$

$$M^1OS(O)\text{-}L^{11}\text{-}C(R)\!=\!CH_2 \quad (IIh)$$

wherein
R is hydrogen, Cl, F or $CH_3$;
$R^1$ is H or $C_1$ to $C_6$ alkyl;
$M^1$ is a hydrogen or cation, and preferred cations are alkali metal cations, such as sodium, potassium and lithium cations; and ammonium cations, such as ammonium, tetramethylammonium, and monoethanolammonium ions;
$L^{11}$ is a bond or an organic linking group having 2 to about 20 carbon atoms, said linking group optionally interrupted by one or two hetero-radicals selected from the group consisting of —O—, —$NR^1$—, —S—, —SO—, —$SO_2$—, —$N(R^1)C$(O)—, and —OC(O)— wherein $R^1$ is H or $C_1$ to $C_6$ alkyl, and said linking group optionally substituted with $CH_2Cl$;
X is —O—, —$NR^1$—, or —S—; and
k is 1 or 2;
and wherein the nitrogen in formula (IIb) is from about 40% to 100% salinized.

Water solvatable monomers of formula (IIa) include acrylic and (meth)acrylic acid and their alkali metal salts. Water solvatable monomers of formula (IIb) include 2-(N,N-dimethylamino)ethyl acrylate and 3-(N,N,-diimethylamino)propyl acrylate. Water solvatable monomers of formula (IIc) include 2-methacryloyloxyethyl succinic acid, 2-methacryloyloxyethyl phthalic acid, 2-methacryloyloxyethyl hexhydrophthalic acid, 2-acryloyloxypropyl phthalic acid, and 2-acryloyloxypropyl hexahydrophthalic acid. Water solvatable monomers of formula (IId) include 2-methacryloyloxyethyl acid phosphate, and 2-methacryloyloxypropyl acid phosphate. Water solvatable monomers of formula (IIe) include 2-acrylamido-2-methylpropane sulfonic acid, 2-sulfoethyl acrylate, 2-sulfopropyl acrylate, 4-sulfophenyl acrylate, 2-hydroxy-3-sulfopropyl acrylate; and 4-methacrylamidobenzene sulfonic acid. Water solvatable monomers of formula (IIf) include 4-vinylbenzene sulfonic acid and sodium 3-allyloxy-2-hydroxypropane sulfonate. Water solvatable monomers of formula (IIg) include vinyl sulfonic acid. Water solvatable monomers of formula (IIh) include 4-vinylbenzene sulfinic acid.

The third reactant in the copolymerization is at least one polymerizable nanoparticle. The polymerizable nanoparticles suitable for use in the compositions of the invention can be any non-fluorinated inorganic oxide particle having ethylenically unsaturated groups linked to the particle surface, such that the particle has the capability to covalently bond to the fluoropolymer during copolymerization. Ethylenically unsaturated groups include (meth)acrylates, maleates, maleimides, fumerates, styrenes and substituted styrenes, unsaturated hydrocarbons including vinyl, allyl and diene groups. In one preferred embodiment, the polymerizable nanoparticles have ethylenically unsaturated groups that are selected from (meth)acrylates, styrenes, vinyl and allyl groups. A most preferred form of polymerizable nanoparticles are (meth) acrylate-modified nanoparticles. In one embodiment the polymerizable nanoparticle component comprises inorganic oxides of Si, Ti, Zn, Mn, Al, and Zr. Preferably the inorganic oxides have an average particle size of from about 10 to about 500 nm; preferably from about 50 to about 500 nm; more preferably from about 80 to about 400 nm, and more preferably from about 100 to about 300 nm. In one embodiment polymerizable nanoparticles are fumed particles. In another embodiment the polymerizable nanoparticles component is a colloidal particle made by hydrolysis of an alkoxy silane, chlorosilane, metal alkoxide, or metal halide.

Commercially available polymerizable nanoparticles useful in forming the compositions of the invention include surface modified fumed silicas under the tradename AEROXIDE® R711 from Degussa, Inc., now Evonik Industries, Essen, Germany.

The polymerizable nanoparticles useful in the invention can be provided by synthetic modification of nanoparticles. For instance, a commercial fumed inorganic oxide can be treated with a silylating agent comprising an ethylenically unsaturated group. Examples of silylating agents useful in the synthesis of polymerizable nanoparticles include 3-acryloyloxypropyl trichlorosilane, 3-methacryloyloxypropyl trichlorosilane, 3-acryloyloxypropyl trimethoxysilane, 3-methacryloyloxypropyl tirmethoxysilane, 3-acryloyloxypropyl triethoxysilane, 3-methacryloyloxypropyl triethoxysilane, vinyl trichlorosilane, vinyl trimethoxysilane, vinyl triethoxysilane, allyl trichlorosilane, allyltrimethoxysilane, allyl triethoxysilane, allyl triisopropylsilane, and allylchlorodimethylsilane. Many of these silylating agents are commercially available from Aldrich Chemical Co., Milwaukee Wis., and/or from Dow Chemical Co., Midland Mich.

Other suitable agents for treating a fumed inorganic oxide include the following:

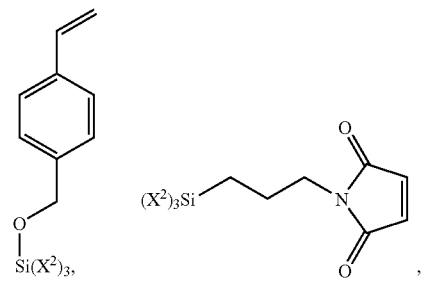

-continued

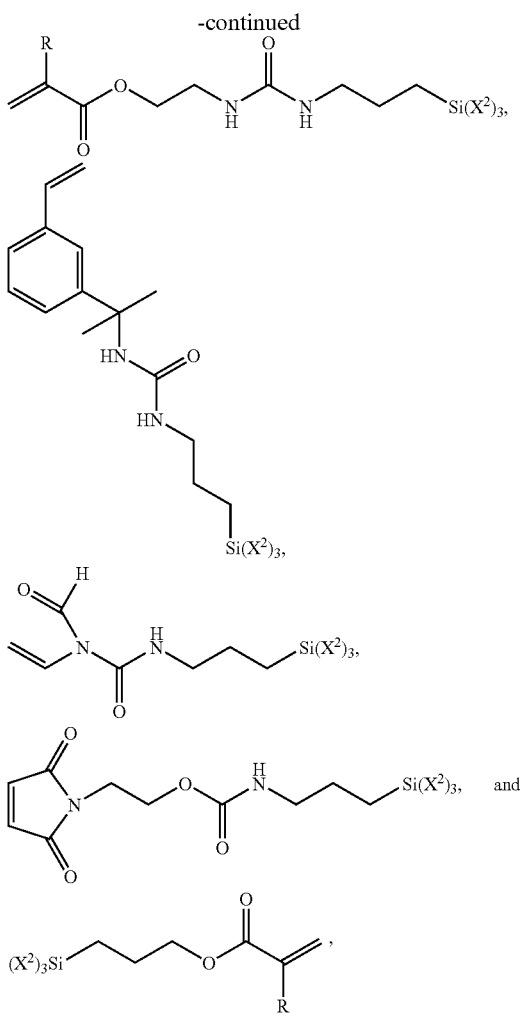

wherein

X² is Cl (chloride) and —OR⁵ wherein R⁵ is a linear or branched $C_1$ to $C_4$ alkyl.

The polymerizable nanoparticles can be prepared by treating fumed nanoparticles with the above silylating agents under anhydrous conditions in an inert solvent such as a hydrocarbon. The amount of silylating agent can be varied as desired to provide the desired level, or equivalent weight, of ethylenically unsaturated groups. The reaction mixture is typically heated to about 40 to 80° C. for 1 to 12 hours to complete the reaction. The polymerizable nanoparticles can be isolated by centrifugation of the reaction mixture. The particles are typically washed with further solvent to remove undesired impurities as needed.

Colloidal particles useful in preparing polymerizable nanoparticles for compositions of the invention include colloidal aluminas, for example CATAPAL and DISPAL aluminas available from Vista Chemical Company, West Creek, N.J.; and colloidal silica suspensions, for instance NALCO silicas available from Nalco Chemical Company, Naperville, Ill., SNOWTEX from Nissan Chemicals, Houston, Tex., and Nano G from Clairant Specialty Fine Chemicals, Muttenz, Switzerland.

Specialty inorganic oxides at least partially surface-modified with hydrophobic groups, useful in preparing polymerizable nanoparticles useful in the invention, can be made by synthesis. One embodiment of the invention is a composition wherein the polymerizable nanoparticles are surface modified inorganic oxide particles comprising an oxide of M atoms independently selected from the group consisting of Si, Ti, Zn, Zr, Mn, Al, and combinations thereof; at least one particle having a surface covalently bonded to at least one group represented by formula (IV)

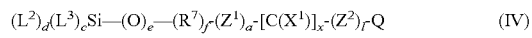

wherein:

$L^2$ is an oxygen covalently bonded to M; and each $L^3$ is independently selected from the group consisting of H, a $C_1$ to $C_2$ alkyl, and OH; d and c are each independently integers such that: d is greater than or equal to 1, c is greater than or equal to 0, and d+c is 3;

e, f, a, x, and l are each independently 0 or 1;

$R^7$ is $C_1$ to $C_{12}$ alkyl, linear or branched $Z^1$ is —NH—;

$X^1$ is O or S;

$Z^2$ is NH, N—C(O)—OH, N—C(O)— or OCH₂CH₂N—C(O)— provided that when $Z^2$ is N—C(O)— or OCH₂CH₂N—C(O)— that Q forms a 5 member heterocyclic ring represented by N—C(O)—CH=CH—C(O)—; and Q is selected from the group consisting of a $C_2$-$C_{12}$ hydrocarbylene optionally interrupted by —O—C(O)—, —C(O)—O— or one divalent organic group.

In one embodiment the surface modified inorganic oxide particles useful in the compositions of the invention comprise M atoms that are Si.

In another embodiment the copolymer composition further comprises at least one additional monomer selected from (d), (e), (f), or (g) copolymerized in the following percentage by weight:

(d) from about 1% to about 35% vinylidene chloride, vinyl chloride, or vinyl acetate, or a mixture thereof; or (e) from about 0.5% to about 25% of at least one monomer selected from the group consisting of styrene, methyl-substituted styrene, chloromethyl-substituted styrene, 2-hydroxyethyl (meth)acrylate, ethylenediol di(meth)acrylate, N-methyloyl (meth)acrylamide, $C_1$ to $C_5$ alkyl (meth)acrylate, and a compound of formula (XX):

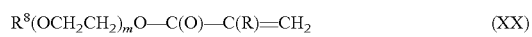

wherein m is 2 to about 10;

$R^8$ is hydrogen, a $C_1$ to $C_4$ alkyl, or CH₂=C(R)C(O)—O—; and each R is hydrogen, Cl, F or CH₃; or (f) from about 0.5% to about 10% of at least one monomer of formula (XXIa), (XXIb) or (XXIc):

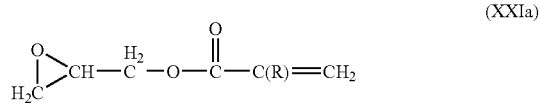

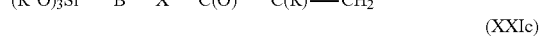

wherein each R is independently hydrogen, Cl, F or CH₃;

$R^9$ is a linear or branched $C_1$ to $C_4$ alkyl;

$B^1$ is a divalent linear or branched $C_2$ to $C_4$ alkylene;

$B^2$ is a covalent bond or a divalent linear or branched $C_1$ to $C_4$ alkylene;
and
X is —O—, —$NR^1$—, or —S—; wherein $R^1$ is H or $C_1$-$C_6$ alkyl; or (g) 1% to about 35% of any combination of (d), (e), or (f).

The present invention further comprises a method of treating fibrous substrates to impart oil repellency and water repellency comprising applying to the surface of the substrate a polymer of the invention as described above. The aqueous emulsion of this invention is applied directly to a textile or substrate to be rendered oil- and water-repellent. The emulsion of this invention is applied alone or in admixture with dilute nonfluorinated polymers, or with other textile treatment agents or finishes. The composition can be applied at a manufacturing facility, retailer location, or prior to installation and use, or at a consumer location.

Fibrous substrates suitable for practicing the method of the invention include those as described below. The emulsion polymers of this invention are generally applied to fibrous substrates by spraying, dipping, padding, or other well-known methods. The emulsions of the invention are generally diluted with water to concentrations of from about 5 g/L to about 100 g/L, preferably from about 10 g/L to about 50 g/L, based upon the weight of the fully formulated emulsion. After excess liquid has been removed, for example by squeeze rolls, the treated fabric is dried and then cured by heating, for example, to 110° C. to 190° C., for at least 30 seconds, typically 60 to 180 seconds. Such curing enhances repellency and durability. While these curing conditions are typical, some commercial apparatus may operate outside these ranges because of its specific design features.

The present invention further comprises a fibrous substrate having applied to its surface a polymer of the invention as previously described. Preferably the treated substrate has a fluorine content of from about 0.05% by weight to about 0.5% by weight.

Suitable substrates include fibrous substrates. The fibrous substrates include woven and nonwoven fibers, yarns, fabrics, fabric blends, textiles, nonwovens, paper, leather, rugs and carpets. These are made from natural or synthetic fibers including cotton, cellulose, wool, silk, polyamide, polyester, polyolefin, polyacrylonitrile, polypropylene, rayon, nylon, aramid, and acetate. By "fabric blends" is meant fabric made of two or more types of fibers. Typically, these blends are a combination of at least one natural fiber and at least one synthetic fiber, but also can include a blend of two or more natural fibers or of two or more synthetic fibers. Carpet substrates can be dyed, pigmented, printed, or undyed. Fibers and yarns in the carpet substrates may be dyed, pigmented, printed, or undyed. Carpet substrates can be scoured or unscoured. Substrates to which it is particularly advantageous to apply the compounds of the present invention so as to impart repellency properties include polyamide (such as nylon) polyester, cotton, and blends of polyester and cotton. The nonwoven substrates include, for example, spunlaced nonwovens, such as SONTARA available from E.I. du Pont de Nemours and Company, Wilmington, Del., and spun-bonded-meltblown-spunbonded (SPS) nonwovens.

The emulsions of this invention are useful in rendering the substrate surface repellent to oil and water. The repellency is durable after multiple launderings. The polymer emulsions of the present invention also have the advantage of providing such repellency while containing short chain perfluoroalkyl groups having from about 2 to about 7 carbon atoms. The emulsions of the present invention are advantageous in that they can be used under a wide variety of application conditions due to their stability. The treated substrates of the present invention are useful in a variety of applications and products such as clothing, protective garments, carpet, upholstery, furnishings, and other uses. Specifically, the present invention will concentrate on IPA/water repellency ratings of these novel emulsion—based formulations on spunbond-melt blown-spunbond (SMS) polypropylene fabric. The excellent surface properties described above help to maintain surface cleanliness and therefore can permit longer use.

Test Methods and Materials

The following test methods and materials were used in the examples herein.

Test Method 1—Water Repellency

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Ratings of 0.5 increments are determined by subtracting one half from the numbers in Table 1 for borderline passing of the test liquid.

TABLE 1

Standard Test Liquids

| Water Repellency Rating Number | Composition Vol. %, Isopropyl Alcohol | Composition, Vol. % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 2

Hydrostatic pressure is a measure of the pressure needed for deionized water to penetrate a test fabric and is measured by the method INDA IST 80.4.

It measures the resistance of fabric to the penetration of water under static pressure. A nonwoven fabric sample, mounted to form the base of a reservoir, is subjected to water pressure increasing at a constant rate until leakage appears on the lower surface of the fabric. The water pressure is measured at the hydrostatic head height reached at the first sign of leakage in three separate areas on the specimen and the results averaged. Results are recorded in cm of water above the sample. The water is introduced at a temperature of 27° C.±3° C. from above the fabric sample over a circular area 114±1.3 mm in diameter, at a rate of 1.0±0.1 cm of hydrostatic head per second. Testing equipment is available from Richmond Machine Company, Philadelphia, Pa. 19134.

TABLE 2

Materials

| Descriptor | Generic name/structure | Source |
|---|---|---|
| AEROXIDE R711 | Acrylate modified silica | Degussa, Düsseldorf, Germany, now Evonik Industries, Essen, Germany |
| AVITEX ® R | Cationic surfactant, 25-30 wt % in water | E. I. du Pont de Nemours and Company, Wilmington, DE |
| BRIJ 58 | polyethylene glycol hexadecyl ether | Aldrich Chemical Co, Milwaukee, WI |
| 7-EO methacrylate | poly(oxyethylene)-7 methacrylate | Aldrich Chemical Co, Milwaukee, WI |
| MAM | N-methylol acrylamide | Aldrich Chemical Co, Milwaukee, WI |
| HEMA | 2-hydroxyethyl methacrylate | Aldrich Chemical Co, |
| DDM | dodecyl mercaptan | Aldrich Chemical Co, |
| DPG | dipropylene glycol | Aldrich Chemical Co, |
| VAZO 56 WSP | 2,2'-azobis-(2-methylproprionamide) dihydrochloride | E. I. du Pont de Nemours and Company, Wilmington, DE |

EXAMPLES

Example 1

An emulsion was prepared by first mixing deionized water (200 g), AVITEX R (5.0 g), BRIJ 58 (5.0 g, 20% by weight in deionized water), AEROXIDE R711 fumed silica particles (0.1 g) pre-sonified in 1H, 1H, 2H, 2H-perfluorooctyl methacrylate (22 g), stearyl acrylate (7.3 g) and acetone (1.8 g). The resulting mixture was heated to 50° C., sonified and then charged into a flask equipped with a subsurface nitrogen sparge. The mixture was sparged with nitrogen until it reached a temperature below 32° C. Vinylidene chloride (7.3 g) was then added to the mixture under a nitrogen blanket and stirred for 15 minutes followed by the addition of a solution of VAZO-56 (0.50 g) in deionized water (10.0 g). The reaction mixture was heated to 50° C. and stirred for 8 h. A mixture 2-ethylhexyl methacrylate (13.7 g), polyethylene glycol methacrylate (4.6 g) and acetone (0.9 g) was then added to the cooled reaction mixture and allowed to stir for 15 minutes followed by the addition of a solution of VAZO-56 (0.25 g) in deionized water (5.0 g) under a nitrogen blanket. The mixture was then heated to 50° C. and stirred for 8 h followed by the addition of hexylene glycol (10 g) and deionized water (50 g). Gravity filtration of the resulting mixture using a milk filter resulted in an emulsion polymer with 12.0% solids, and 3.5% F. The emulsion polymer was applied to spunbond-melt blown-spunbond (SMS) polypropylene fabric (commercially available from Kimberly Clark, Roswell, Ga.), using a pad bath (dipping) process at a 0.10% loading. The fabric was then allowed to air dry and cure at 248° F. for 3 minutes. The fabric was tested for water repellency according to Test Method 1 and 2. Results are listed in Table 3.

Comparative Example A

Comparative Example A illustrates the formation of an acrylic emulsion having no acrylate-modified nanoparticles present. An emulsion was prepared by first mixing deionized water (200 g), AVITEX R (5.0 g), BRIJ 58 (5.0 g, 20% by weight in deionized water), 1H, 1H, 2H, 2H-perfluorooctyl methacrylate (22 g), stearyl acrylate (7.3 g) and acetone (1.8 g). The resulting mixture was heated to 50° C., sonified and then charged into flask equipped with a subsurface nitrogen sparge. The mixture was sparged with nitrogen until it reached a temperature below 32° C. Vinylidene chloride (7.3 g) was then added to the mixture under a nitrogen blanket and stirred for 15 minutes followed by the addition of a solution of VAZO-56 (0.50 g) in deionized water (10.0 g). The reaction mixture was heated to 50° C. and stirred for 8 hours. A sonified mixture of 2-ethylhexyl methacrylate (13.7 g), polyethylene glycol methacrylate (4.6 g) and acetone (0.9 g) was then added to the cooled reaction mixture and allowed to stir for 15 minutes followed by the addition of a solution of VAZO-56 (0.25 g) in deionized water (5.0 g) under a nitrogen blanket. The mixture was then heated to 50° C. and stirred for 8 hours followed by the addition of (10 g) hexylene glycol and (50 g) deionized water. Gravity filtration of the resulting mixture using a milk filter resulted in an emulsion polymer with 12.7% solids, and 3.7% F. The emulsion polymer was applied to SMS polypropylene nonwoven fabrics as in Example 1 and was tested for water repellency using Test Method 1. Results are in Table 3.

Comparative Example B

Comparative Example B illustrates the formation of an acrylate emulsion containing non-polymerized acrylate modified particles. An emulsion was prepared by first mixing deionized water (200 g), AVITEX R (5.0 g), BRIJ 58 (5.0 g, 20% by weight in deionized water), 1H, 1H, 2H, 2H-perfluorooctyl methacrylate (22 g), stearyl acrylate (7.3 g) and acetone (1.8 g). The resulting mixture was heated to 50° C., sonified and then charged into a flask equipped with a subsurface nitrogen sparge. The mixture was sparged with nitrogen until it reached a temperature below 32° C. Vinylidene chloride (7.3 g) was then added to the mixture under a nitrogen blanket and stirred for 15 min followed by the addition of a solution of VAZO-56 (0.50 g) in deionized water (10.0 g). The reaction mixture was heated to 50° C. and stirred for 8 h. A mixture of 2-ethylhexyl methacrylate (13.7 g), polyethylene glycol methacrylate (4.6 g) and acetone (0.9 g) was then added to the cooled mixture and stirred for 15 min followed by the addition of a solution of VAZO-56 (0.25 g) in deionized water (5.0 g). The mixture was then heated to 50° C., stirred for 8 h and then sonified in the presence of hexylene glycol (10 g), deionized water (50 g) and AEROXIDE R711 (0.1 g). Gravity filtration of the resulting mixture using a milk filter resulted in an emulsion polymer with 12.7% solids, and 3.7% F. The emulsion polymer was applied to SMS polypropylene nonwoven fabrics as in Example 1 and was tested for water repellency using Test Method 1. Results are in Table 3.

TABLE 3

|  | Water Repellency | Hydrostatic pressure (mm Hg) |
|---|---|---|
| Comp Example A | 10 | 510 (67,983 Pa) |
| Example 1 | 10 | 620 (82,646 Pa) |
| Comp Example B | 2 | 415 (55,319 Pa) |

The data in Table 3 demonstrated that Example 1 wherein the nanoparticles were copolymerized into the polymer structure provided equivalent water repellency and higher hydrostatic pressure than the Comparative Example A containing no nanoparticles, and superior water repellency and higher hydrostatic pressure than Comparative Example B having non-polymerized particles present.

Example 2

Ethylene (56 g) was introduced to an autoclave charged with $C_4F_9(CH_2CF_2)_2I$ (714 g) and d-(+)-limonene (3.2 g), and the reactor heated at 240° C. for 12 hours. The product was isolated by vacuum distillation to provide $C_4F_9$ $(CH_2CF_2)_2$ $CH_2CH_2I$. A mixture of $C_4F_9(CH_2CF_2)_2$ $CH_2CH_2I$ (10 g, 0.02 mol) and N-methylformamide (8.9 mL, 0.15 mol) was heated to 150° C. for 26 hours. The mixture was cooled to 100° C., followed by the addition of water to separate the crude ester. Ethyl alcohol (3 mL) and p-toluene sulfonic acid (0.09 g) were added and the mixture stirred at 70° C. for 0.25 hours. Ethyl formate and ethyl alcohol were removed by distillation to give a crude product. The crude product was dissolved in ether, washed with 10 wt % aqueous sodium sulfite, water and brine, in turn, and dried over magnesium sulfate. Distillation provided the alcohol product, $CF_3$ $(CF_2)_3(CH_2CF_2)_2CH_2CH_2OH$, (6.5 g, 83% yield): bp 94-95° C. a 2 mm Hg (266 Pascals).

The previously prepared alcohol (400 g) and cyclohexane (308.6 g) were added to a round bottomed flask equipped with a stir bar, a Dean-Stark trap and an addition funnel. p-Toluenesulfonic acid monohydrate (9.2 g) and 4-methoxyphenol (1.4 g) was charge separately to the flask, while the flask was being heated. When the temperature reached 70° C., methacrylic acid (130.4 g) was added dropwise. After all of the methacrylic acid was added, the flask was insulated and the flask temperature was raised to 85° C. Reaction was monitored by GC for formation of $CF_3(CF_2)_3$ $CH_2CF_2CH_2CF_2CH_2CH_2O$—$C(O)$—$C(CH_3)$=$CH_2$ (PPVE-methacrylate). Once all of the alcohol had reacted, the flask was cooled to room temperature. The mixture was then transferred to a separation funnel. The flask was rinsed with ethyl ether, and the ethyl ether wash was then added to the mixture in separation funnel. The reaction mixture was washed three times with sodium bicarbonate (150 mL, 10% w/w solution) and ice and the aqueous layer was removed each time. The reaction mixture was then washed with deionized water (150 mL), and the aqueous layer was removed. An aliquot of the reaction mixture was taken and analyzed by GC to ensure all unreacted methacrylic acid was removed during the washes. The reaction mixture was transferred to a round bottom flask and magnesium sulfate was added to dry the reaction mixture. The reaction mixture was then filtered and the filtered solids were washed with ethyl ether. The reaction mixture was dried over $MgSO_4$, filtered, and concentrated in vacuo on a rotary evaporator at high vacuum to give a liquid (10.1 g). Analysis by GC and NMR revealed the reaction mixture was $CF_3(CF_2)_3CH_2CF_2CH_2CF_2CH_2CH_2O$—$C$ $(O)$—$C(CH_3)$=$CH_2$. 1H NMR (CDCl3, 400 MHz): 6.12~6.11 (1H, m), 5.60~5.59 (1H, m), 4.38 (2H, t, J=6.0 Hz), 2.94~2.66 (4H, m), 2.38 (2H, t-t, J1=16.5 Hz, J2=6 Hz), 1.95~1.94 (3H, m); MS: 461 (M++1).

An emulsion was prepared by first mixing deionized water (100 g), AVITEX R (2.5 g), BRIJ 58 (2.5 g, 20 wt % in deionized water), (0.05 g) AEROXIDE R711 fumed silica particles pre-sonified in $CF_3(CF_2)_3$ $CH_2CF_2CH_2CF_2CH_2CH_2O$—$C(O)$—$C(CH_3)$=$CH_2$ (8.4 g), stearyl acrylate (3.7 g) and acetone (0.9 g). The resulting mixture was heated to 50° C., sonified and then charged into a flask equipped with a subsurface nitrogen sparge. The mixture was sparged with nitrogen until it reached a temperature below 32° C. Vinylidene chloride (3.7 g) was then added to the mixture under a nitrogen blanket and stirred for 15 minutes followed by the addition of a solution of VAZO-56 (0.25 g) in deionized water (5.0 g). The reaction mixture was heated to 50° C. and stirred for 8 h. A mixture of 2-ethylhexyl methacrylate (6.9 g), polyethylene glycol methacrylate (2.3 g) and acetone (0.5 g) was then added to the cooled reaction mixture and allowed to stir for 15 min followed by the addition of a solution of VAZO-56 (0.13 g) in deionized water (0.13 g) under a nitrogen blanket. The mixture was then heated to 50° C. and stirred for 8 h followed by the addition of hexylene glycol (5 g) and deionized water (25 g). Gravity filtration of the resulting mixture using a milk filter resulted in an emulsion polymer with 16.8% solids, and 3.0% F. The emulsion polymer was applied to spunbond-melt blownspunbond (SMS) polypropylene fabric available from Kimberly Clark, Roswell, Ga., using a pad bath (dipping) process at a 0.10% loading. The fabric was then allowed to air dry and cure at 248° F. for 3 minutes. The fabric was tested for water repellency according to Test Method 1 and 2. Results are listed in Table 4.

Comparative Example C

Comparative Example C illustrates the formation of an acrylic emulsion having no acrylate-modified nanoparticles present. An emulsion was prepared by first mixing deionized water (100 g), AVITEX R (2.5 g), BRIJ 58 (2.5 g 20% by weight in deionized water), $CF_3(CF_2)_3$ $CH_2CF_2CH_2CF_2CH_2CH_2O$—$C(O)$—$C(CH_3)$=$CH_2$ (8.4 g), stearyl acrylate (3.7 g) and acetone (0.9 g). The resulting mixture was heated to 50° C., sonified and then charged into a flask equipped with a subsurface nitrogen sparge. The mixture was sparged with nitrogen until it reached a temperature below 32° C. Vinylidene chloride (3.7 g) was then added to the mixture under a nitrogen blanket and stirred for 15 minutes followed by the addition of a solution of VAZO-56 (0.25 g) in deionized water (5.0 g). The reaction mixture was heated to 50° C. and stirred for 8 h. A mixture of a sonified solution of 2-ethylhexyl methacrylate (6.9 g), polyethylene glycol methacrylate (2.3 g) and acetone (0.5 g) was then added to the cooled reaction mixture and allowed to sir for 15 min followed by the addition of a solution of VAZO-56 (0.13 g) in deionized water (2.5 g) under a nitrogen blanket. The mixture was then heated to 50° C. and stirred for 8 h followed by the addition of hexylene glycol (5 g) and deionized water (25 g). Gravity filtration of the resulting mixture using a milk filter resulted in an emulsion polymer with 13.0% solids, and 2.3% F The emulsion polymer was applied to SMS polypropylene nonwoven fabrics as in Example 2 and was tested for water repellency using Test Method 1. Results are in Table 4.

Comparative Example D

Comparative Example D illustrates the formation of an acrylate emulsion containing non-polymerized acrylate modified particles. An emulsion was prepared by first mixing deionized water (100 g), AVITEX R (2.5 g), BRIJ 58 (2.5 g, 20% by weight in deionized water), $CF_3(CF_2)_3$ $CH_2CF_2CH_2CF_2CH_2CH_2O$—$C(O)$—$C(CH_3)$=$CH_2$ (8.4 g), stearyl acrylate (3.7 g) and acetone (0.9 g). The resulting mixture was heated to 50° C., sonified and then charged into a flask equipped with a subsurface nitrogen sparge. The mixture was sparged with nitrogen until it reached a temperature below 32° C. 3.7 g of vinylidene chloride was then added to the mixture under a nitrogen blanket and stirred for 15 minutes followed by the addition of a solution of VAZO-56 (0.25 g) in deionized water (5.0 g). The reaction mixture was heated to 50° C. and stirred for 8 h. A mixture of 2-ethylhexyl methacrylate (6.9 g), polyethylene glycol methacrylate (2.3 g) and acetone (0.5 g) was then added to the cooled reaction mixture and allowed to stir for 15 min followed by the addition of a solution of VAZO-56 (0.13 g) in deionized water (2.5 g) under a nitrogen blanket. The mixture was then heated to 50° C., stirred for 8 h and then sonified in the presence of hexylene glycol (5 g), deionized water (25 g) and AEROXIDE R711 (0.05 g). Gravity filtration of the resulting mixture using a milk filter resulted in an emulsion polymer with 13.0% solids, and 2.3% F. The emulsion polymer was applied to SMS polypropylene nonwoven fabrics as in Example 2 and was tested for water repellency using Test Method 1. Results are in Table 4.

TABLE 4

|  | Water Repellency | Hydrostatic pressure (mm Hg) |
|---|---|---|
| Comp Example C | 3 | 459 (61,195 Pa) |
| Example 2 | 4 | 542 (72,261 Pa) |
| Comp Example D | 3 | 500 (66,661 Pa) |

The data in Table 4 demonstrated that Example 2 wherein the particles were copolymerized into the polymer structure provided superior water repellency and higher hydrostatic pressure than the Comparative Example C containing no particles and Comparative Example D having non-polymerized particles present.

Example 3

In a dry box, a 500 mL Pyrex bottle was charged with diethylene glycol (175 mL, 99%, commercially available from Aldrich Chemical Company, Milwaukee, Wis.) and 80 mL of anhydrous tetrahydrofuran. Sodium hydride (3.90 g) was added slowly with magnetic stirring until the completion of hydrogen evolution. The capped bottle was removed from the drybox, and the solution was transferred to a 400 mL metal shaker tube in a nitrogen filled glovebag. The shaker tube was cooled to an internal temperature of −18° C., shaking was started, and perfluoropropylvinyl ether (41 g) was added from a metal cylinder. The mixture was allowed to warm to room temperature and was shaken for 20 h. The reaction mixture was combined with a duplicate reaction run in a separate 400 mL shaker tube. The combined reaction mixtures were added to 600 mL of water, and this mixture was extracted with 3×200 mL of diethyl ether in a separatory funnel. The ether extracts were dried over $MgSO_4$, filtered, and concentrated in vacuo on a rotary evaporator to give a liquid (119.0 g) 1H NMR in $CD_3OD$, and analysis by gas chromatography (GC) both showed a small amount of diethylene glycol. This material was dissolved in 150 mL of diethyl ether and extracted with water (3×150 mL) in a separatory funnel. The ether layer was dried over $MgSO_4$, filtered, and concentrated in vacuo on a rotary evaporator at high vacuum to give a liquid (99.1 g) of perfluoropropylvinyl ether alcohol (PPVE) $[CF_3(CF_2)_2OCHFCF_2—CH_2CH_2OH]$. 1H NMR ($C_6D_6$, ppm downfield of TMS) showed 97 mole % desired mono-PPVE adduct: 1.77 (broad s, OH), 3.08-3.12 (m, $OCH_2CH_2OCH_2CH_2OH$), 3.42 (t, $OCH_2CH_2OCH_2CH_2OH$), 3.61 (t, $OCH_2CH_2OCH_2CH_2OH$), 5.496 (doublet of triplets, $^2JH—F=53$ Hz, $^3JH—F=3$ Hz $OCF_2CHFOC_3F_7$), and 3 mole % of the bis PPVE adduct: 5.470 (doublet of triplets, $^2JH—F=53$ Hz, $^3JH—F=3$ Hz, $C_3F7OC HFCF_2OCH_2CH_2OCH_2CH_2OCF_2CHFOC_2F_7$). The other peaks for the bis PPVE adduct overlapped with the mono PPVE adduct.

Perfluoropropylvinyl ether alcohol, $CF_3(CF_2)_2 OCHFCF_2—CH_2CH_2OH$, (400 g) and cyclohexane (308.6 g) were added to a round bottomed flask equipped with a stir bar, a Dean-Stark trap and an addition funnel. p-Toluenesulfonic acid monohydrate (9.2 g) and 4-methoxyphenol (1.4 g) was charge separately to the flask, while the flask was being heated. When the temperature reached 70° C., methacrylic acid (130.4 g) is added dropwise. After all of the methacrylic acid was added, the flask was insulted and the flask temperature was raised to 85° C. Reaction was monitored by GC for formation of perfluoropropylvinyl ether methacrylate. Once all of the perfluoropropylvinyl ether alcohol had reacted, the flask was cooled to room temperature. The mixture was then transferred to a separation funnel. The flask was rinsed with ethyl ether, and the ethyl ether wash was then added to the mixture in separation funnel. The reaction mixture was washed three times with sodium bicarbonate (150 mL, 10% w/w solution) and ice and the aqueous layer was removed each time. The reaction mixture was then washed with deionized water (150 mL), and the aqueous layer was removed. An aliquot of the reaction mixture was taken and analyzed by GC to ensure all unreacted methacrylic acid was removed during the washes. The reaction mixture was transferred to a round bottom flask and magnesium sulfate was added to dry the reaction mixture. The reaction mixture was then filtered and the filtered solids were washed with ethyl ether. The reaction mixture was dried over MgSO4, filtered, and concentrated in vacuo on a rotary evaporator at high vacuum to give a liquid (10.1 g). Analysis by GC revealed the reaction mixture was $CF_3(CF_2)_2OCHFCF_2CH_2CH_2O—C(O)—C(CH_3)=CH_2$.

An emulsion was prepared by first mixing deionized water (100 g), AVITEX R (2.5 g), BRIJ 58 (2.5 g, 20% by weight in deionized water), AEROXIDE R711 fumed silica particles (0.05 g) pre-sonified in $CF_3(CF_2)_2OCHFCF_2CH_2CH_2O—C(O)—C(CH_3)=CH_2$ (11.5 g), stearyl acrylate (3.7 g) and acetone (0.9 g). The resulting mixture was heated to 50° C., sonified and then charged into a flask equipped with a sub-surface nitrogen sparge. The mixture was sparged with nitrogen until it reached a temperature below 32° C. Vinylidene chloride (3.7 g) was then added to the mixture under a nitrogen blanket and stirred for 15 minutes followed by the addition of a solution of VAZO-56 (0.25 g) in deionized water (5.0 g). The reaction mixture was heated to 50° C. and stirred for 8 h. A mixture of a sonified solution of 2-ethylhexyl methacrylate (6.9 g), polyethylene glycol methacrylate (2.3 g) and acetone (0.5 g) was then added to the cooled reaction mixture and allowed to sir for 15 min followed by the addition of a solution of VAZO-56 (0.13 g) in of deionized water (2.5 g) under a nitrogen blanket. The mixture was then heated to 50° C. and stirred for 8 h followed by the addition of hexylene glycol (5 g) and deionized water (25 g). Gravity filtration of the resulting mixture using a milk filter resulted in an emulsion polymer with 17.4% solids, and 3.7% F. The emulsion polymer was applied to spunbond-melt blown-spunbond (SMS) polypropylene fabric available from Kimberly Clark, Roswell, Ga., using a pad bath (dipping) process at a 0.10% loading. The fabric was then allowed to air dry and cure at 248° F. for 3 minutes. The fabric was tested for water repellency according to Test Method 1 and 2. Results are listed in Table 5.

Comparative Example E

Comparative Example E illustrates the formation of an acrylic emulsion having no acrylate-modified nanoparticles present. An emulsion was prepared by first mixing deionized water (100 g), AVITEX R (2.5 g), BRIJ 58 (2.5 g, 20% by weight in deionized water), $CF_3(CF_2)_2 OCHFCF_2CH_2CH_2O—C(O)—C(CH_3)=CH_2$ (11.6 g), stearyl acrylate (3.7 g) and acetone (0.9 g). The resulting mixture was heated to 50° C., sonified and then charged into a flask equipped with a subsurface nitrogen sparge. The mixture was sparged with nitrogen until it reached a temperature below 32° C. Vinylidene chloride (3.7 g) was then added to the mixture under a nitrogen blanket and stirred for 15 minutes followed by the addition of a solution of VAZO-56 (0.25 g) in deionized water (5.0 g). The reaction mixture was heated to 50° C. and stirred for 8 h. A mixture of a sonified solution of 2-ethylhexyl methacrylate (6.9 g), polyethylene glycol methacrylate (2.3 g) and acetone (0.5 g) was then added to the cooled reaction mixture and allowed to sir for 15 min followed by the addition of a solution of VAZO-56 (0.13 g) in deionized water (2.5 g) under a nitrogen blanket. The mixture was then heated to 50° C. and stirred for 8 h followed by the addition of hexylene glycol (5 g) and deionized water (25 g). Gravity filtration of the resulting mixture using a milk filter resulted in an emulsion polymer with 16.0% solids, and 3.4% F. The emulsion polymer was applied to SMS polypropylene nonwoven fabrics as in Example 3 and was tested for water repellency using Test Method 1. Results are in Table 5.

Comparative Example F

Comparative Example F illustrates the formation of an acrylate emulsion containing non-polymerized acrylate modified nanoparticles. An emulsion was prepared by first mixing deionized water (100 g), AVITEX R (2.5 g), BRIJ 58 (2.5 g, 20% by weight in deionized water), $CF_3(CF_2)_2OCHFCF_2CH_2CH_2O—C(O)—C(CH_3)=CH_2$ (11.6 g), stearyl acrylate (3.7 g) and acetone (0.9 g). The resulting mixture was heated to 50° C., sonified and then charged into a flask equipped with a subsurface nitrogen sparge. The mixture was sparged with nitrogen until it reached a temperature below 32° C. Vinylidene chloride (3.7 g) was then added to the mixture under a nitrogen blanket and stirred for 15 minutes followed by the addition of a solution of VAZO-56 (0.25 g) in deionized water (5.0 g). The reaction mixture was heated to 50° C. and stirred for 8 h. A mixture of a sonified solution of 2-ethylhexyl methacrylate (6.9 g), polyethylene glycol methacrylate (2.3 g) and acetone (0.5 g) was then added to the cooled reaction mixture and allowed to stir for 15 min followed by the addition of a solution of VAZO-56 (0.13 g) in deionized water (2.5 g) under a nitrogen blanket. The mixture was then heated to 50° C., stirred for 8 h and then sonified in the presence of hexylene glycol (5 g), deionized water (25 g) and AEROXIDE R711 (0.05 g). Gravity filtration of the resulting mixture using a milk filter resulted in an emulsion polymer with 16.0% solids, and 3.4% F. The emulsion polymer was applied to SMS polypropylene nonwoven fabrics as in Example 3 and was tested for water repellency using Test Method 1. Results are in Table 5.

TABLE 5

|  | Water Repellency | Hydrostatic pressure (mm Hg) |
| --- | --- | --- |
| Comp Example E | 7 | 629 (83,860 Pa) |
| Example 3 | 9 | 694 (92,526 Pa) |
| Comp Example F | 5 | 529 (70,528 Pa) |

The data in Table 5 demonstrated that Example 3 wherein the nanoparticles were copolymerized into the polymer structure provided superior water repellency and higher hydrostatic pressure than the Comparative Example E containing no nanoparticles and Comparative Example F having non-polymerized particles present.

Example 4

A one gallon reactor was charged with perfluoroethylethyl iodide (PFEEI) (850 g). After cool evacuation, ethylene and tetrafluoroethylene in 27:73 ratio were added until pressure reached 60 psig (413.7×103 Pa). The reaction was then heated to 70° C. More ethylene and tetrafluoroethylene in 27:73 ratio were added until pressure reached 160 psig (1103×103 Pa). A lauroyl peroxide solution (4 g lauroyl peroxide in 150 g perfluoroethylethyl iodide) was added at 1 mL/min rate for 1 hour. Gas feed ratio was adjusted to 1:1 of ethylene and tetrafluoroethylene and the pressure maintained at 160 psig (1103×103 Pa). After about 67 g of ethylene was added, both ethylene and tetrafluoroethylene feeds were stopped. The reaction was heated at 70° C. for another 8 hours. The volatiles were removed by vacuum distillation at room temperature. A mixture of iodides (773 g) was obtained, which contained 1,1,2,2,5,5,6,6-octahydroperfluoro-1-iodooctane and 1,1,2,2,5,5,6,6,9,9,10,10-dodecahydroperfluoro-1-iodo-dodecane as major components in about 2:1 ratio.

The mixture of iodides (46.5 g) and N-methylformamide (NMF) (273 mL) was heated to 150° C. for 19 hours. The reaction mixture was washed with water (4×500 mL) to give a residue. A mixture of this residue, ethanol (200 mL), and concentrated hydrochloric acid (1 mL) was gently refluxed (85° C. bath temperature) for 24 hours. The reaction mixture was poured into water (300 mL). The solid was washed with water (2×75 mL) and dried under vacuum (2 torr) to give a mixture of alcohols, 26.5 g, which contained 1,2,2,5,5,6,6-octahydroperfluoro-1-octanol and 1,1,2,2,5,5,6,6,9,9,10,10-dodecahydroperfluoro-1-dodecanol as major components.

A 500 mL flask was charged with the mixture of alcohols (24.5 g) prepared previously, triethylamine (9.8 g), and tetrahydrofuran (100 mL). Acryloyl chloride (8.8 g) in tetrahydrofuran (10 mL) was added drop wise at about 10° C. Another 40 mL tetrahydrofuran was added and the resulting mixture was stirred at room temperature for 15 hours, 30° C. for 2 hours. The solid was removed by filtration and washed with tetrahydrofuran (50 mL). The combined filtrate and washer were concentrated to give a residue. The residue was mixed with ether (600 mL) and ether insoluble solids were removed by filtration. The ether solution was then washed with $NaHCO_3$ to almost neutral then water (3×50 mL), NaCl (sat.), dried over anhydrous $Na_2SO_4$, concentrated and dried on vacuum to solid product (19.8 g), which contained 1,1,2,2,5,5,6,6-octahydroperfluorooctyl acrylate and 1,1,2,2,5,5,6,6,9,9,10,10-dodecahydroperfluorododecyl acrylate as major components (referred to herein as ethylene-tetrafluoroethylene acrylate).

An emulsion was prepared by first mixing deionized water (100 g), AVITEX R (2.5 g), BRIJ 58 (2.5 g, 20% by weight in deionized water), ethylene-tetrafluoroethylene acrylate (8.8 g) presonified with AEROXIDE R711 fumed silica particles (0.05 g), stearyl acrylate (3.7 g) and acetone (0.9 g). The resulting mixture was heated to 50° C., sonified and then charged into a flask equipped with a subsurface nitrogen sparge. The mixture was sparged with nitrogen until it reached a temperature below 32 C. Vinylidene chloride (3.7 g) was then added to the mixture under a nitrogen blanket and stirred for 15 minutes followed by the addition of a solution of VAZO-56 (0.25 g) in deionized water (5.0 g). The reaction mixture was heated to 50° C. and stirred for 8 h. A mixture of a sonified solution of 2-ethylhexyl methacrylate (6.9 g), polyethylene glycol methacrylate (2.3 g) and acetone (0.5 g) was then added to the cooled reaction mixture and allowed to stir for 15 min followed by the addition of a solution of VAZO-56 (0.13 g) in deionized water (2.5 g) under a nitrogen blanket.

The mixture was then heated to 50° C. and stirred for 8 h followed by the addition of hexylene glycol (5 g) and deionized water (25 g). Gravity filtration of the resulting mixture using a milk filter resulted in an emulsion polymer with 13.5% solids, and 2.3% F. The emulsion polymer was applied to spunbond-melt blown-spunbond (SMS) polypropylene fabric available from Kimberly Clark, Roswell, Ga., using a pad bath (dipping) process at a 0.10% loading. The fabric was then allowed to air dry and cure at 248° F. for 3 minutes. The fabric was tested for water repellency according to Test Method 1 and 2. Results are listed in Table 6.

Comparative Example G

Comparative Example G illustrates the formation of an acrylic emulsion having no acrylate-modified nanoparticles present. An emulsion was prepared by first mixing deionized water (100 g), AVITEX R (2.5 g), BRIJ 58 (2.5 g, 20% by weight in deionized water), ethylene-tetrafluoroethylene acrylate (8.8 g), stearyl acrylate (3.7 g) and acetone (0.9 g). The resulting mixture was heated to 50° C., sonified and then charged into a flask equipped with a subsurface nitrogen sparge. The mixture was sparged with nitrogen until it reached a temperature below 32 C. Vinylidene chloride (3.7 g) was then added to the mixture under a nitrogen blanket and stirred for 15 minutes followed by the addition of a solution of VAZO-56 (0.25 g) in deionized water (5.0 g). The reaction mixture was heated to 50° C. and stirred for 8 h. A mixture of a sonified solution of 2-ethylhexyl methacrylate (6.9 g), polyethylene glycol methacrylate (2.3 g) and acetone (0.5 g) was then added to the cooled reaction mixture and allowed to sir for 15 min followed by the addition of a solution of VAZO-56 (0.13 g) in deionized water (2.5 g) under a nitrogen blanket. The mixture was then heated to 50° C. and stirred for 8 h followed by the addition of hexylene glycol (5 g) and deionized water (25 g). Gravity filtration of the resulting mixture using a milk filter resulted in an emulsion polymer with 13.5% solids, and 2.3% F The emulsion polymer was applied to SMS polypropylene nonwoven fabrics as in Example 4 and was tested for water repellency using Test Method 1. Results are in Table 6.

Comparative Example H

Comparative example H illustrates the formation of an acrylate emulsion containing non-polymerized acrylate modified nanoparticles. An emulsion was prepared by first mixing deionized water (100 g), AVITEX R (2.5 g), BRIJ 58 (2.5 g, 20% by weight in deionized water), ethylene-tetrafluoroethylene acrylate (8.8 g), stearyl acrylate (3.7 g) and acetone (0.9 g). The resulting mixture was heated to 50° C., sonified and then charged into a flask equipped with a subsurface nitrogen sparge. The mixture was sparged with nitrogen until it reached a temperature below 32° C. 3.7 g of vinylidene chloride was then added to the mixture under a nitrogen blanket and stirred for 15 minutes followed by the addition of a solution of VAZO-56 (0.25 g) in deionized water (5.0 g). The reaction mixture was heated to 50° C. and stirred for 8 h. A mixture of a sonified solution of 2-ethylhexyl methacrylate (6.9 g), polyethylene glycol methacrylate (2.3 g) and acetone (0.5 g) was then added to the cooled reaction mixture and allowed to stir for 15 min followed by the addition of a solution of VAZO-56 (0.13 g) in deionized water (2.5 g) under a nitrogen blanket. The mixture was then heated to 50° C., stirred for 8 h and then sonified in the presence of hexylene glycol (5 g), deionized water (25 g) and AEROXIDE R711 (0.05 g). Gravity filtration of the resulting mixture using a milk filter resulted in an emulsion polymer with 13.5% solids, and 2.3% F. The emulsion polymer was applied to SMS polypropylene nonwoven fabrics as in Example 4 and was tested for water repellency using Test Method 1. Results are in Table 6.

TABLE 6

| | Water Repellency | Hydrostatic pressure (mm Hg) |
|---|---|---|
| Comp Example G | 1 | 415 (55,329 Pa) |
| Example 4 | 3 | 520 (69,328 Pa) |
| Comp Example H | 1 | 383 (51,062 Pa) |

The data in Table 6 demonstrated that Example 4 wherein the nanoparticles were copolymerized into the polymer structure provided superior water repellency and higher hydrostatic pressure than the Comparative Example G containing no nanoparticles and Comparative Example H having non-polymerized particles present.

What is claimed is:
1. A fluoropolymer composition comprising monomers copolymerized in the following percentages by weight:
   (a) from about 20% to about 95% of a fluoroalkyl monomer, or mixture of monomers, of formula (I)

wherein
   $R_f^1$ is a monovalent, partially or fully fluorinated, linear or branched, alkyl radical having from about 2 to about 100 carbon atoms; optionally interrupted by 1 to about 50 oxygen atoms; wherein the ratio of carbon atoms to oxygen atoms is at least about 2:1 and no oxygen atoms are bonded to each other;
   L is a bond or a linear or branched divalent linking group having 1 to about 20 carbon atoms, said linking group optionally interrupted by 1 to about 4 hetero-radicals selected from the group consisting of —O—, —NR$^1$—, —S—, —SO—, —SO$_2$—, and —N(R$^1$)C(O)— wherein R$^1$ is H or C$_1$ to C$_6$ alkyl, and said linking group optionally substituted with CH$_2$Cl;
   X is —O—, —N R$^1$—, or —S—;
   R is hydrogen, or CH$_3$;
   (b) from about 5% to about 80% of at least one of:
      (i) an alkyl (meth)acrylate monomer having a linear, branched or cyclic alkyl group of from about 6 to about 18 carbons; or
      (ii) one or more ionizable water solvatable monomers; and
   (c) from about 0.05% to about 2% non-fluorinated polymerizable nanoparticles, wherein the polymerizable nanoparticles have ethylenically unsaturated moieties linked to the particle.
2. The composition of claim 1 wherein $R_f^1$ is F(CF$_2$)$_n$, F(CF$_2$)$_n$(CH$_2$CF$_2$)$_p$, F(CF$_2$)$_n$(CH$_2$)$_x$[(CF$_2$CF$_2$)$_p$(CH$_2$CH$_2$)$_q$]$_m$, F(CF$_2$)$_n$OF(CF$_2$)$_n$, F(CF$_2$)$_n$OCFHCF$_2$, or F(CF$_2$)$_n$[OCF$_2$CF(CF$_3$)]$_p$[OCF$_2$CF$_2$]$_q$, wherein n is 1 to about 6; x is 1 to about 6; p, q, and m are each independently 1 to about 3, and
   r is 0 or 1.
3. The composition of claim 1 wherein L is a bond, —(C$_t$H$_{2t}$)— wherein t is an integer of 1 to 10; phenylene; C$_1$-C$_4$ alkyl substituted phenylene; ethylene oxide; R$^5$; or (A)$_p$-R$^5$; wherein A is a divalent alkyl of 1 to 6 carbons, p is as defined above, and R$^5$ is a divalent radical selected from the group consisting of —S(CH$_2$)$_u$—,

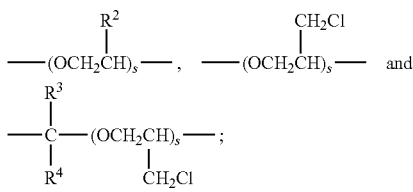

u is an integer of 2 to about 4;
s is an integer of 1 to about 50; and
$R^2$, $R^3$, and $R^4$ are each independently hydrogen or an alkyl group containing 1 to about 6 carbon atoms.

4. The composition of claim 1 wherein formula (I) is selected from the group consisting of $F(CF_2)_n(CH_2)_t(R^5)_r$ X—C(O)—C(R)=CH$_2$, $F(CF_2)_n(CH_2 \ CF_2)_p(CH_2CH_2)_q$ $(R^5)_rX$—C(O)—C(R)=CH$_2$, $F(CF_2)_n(CH_2)_x[CF_2CF_2)_p$ $(CH_2CH_2)_q]_m(R^5)_rX$—C(O)—C(R)=CH$_2$, $F(CF_2)_nO$ $(CF_2)_n \ CH_2(C_tH_{2t})(R^5)_rX$—C(O)—C(R)=CH$_2$, and $F(CF_2)_n \ OCFHCF_2(OCH_2CH_2)_vX$—C(O)—C(R)=CH$_2$,
wherein
n is an integer of 1 to about 6;
t is an integer of 1 to about 10;
p, q, and m are each independently an integer of 1 to about 3;
r is 0 or 1;
v is an integer of 1 to about 4;
$R^5$ is a divalent radical selected from the group consisting of —S(CH$_2$)$_u$—,

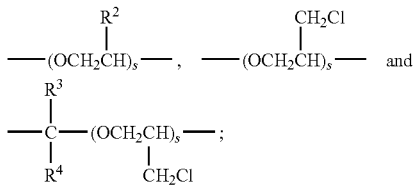

u is an integer of 2 to about 4;
s is an integer of 1 to about 50; and
$R^2$, $R^3$, and $R^4$ are each independently hydrogen or an alkyl group containing 1 to about 6 carbon atoms.

5. The composition of claim 4 wherein n is 4 to 6; p, q, and m are each 1; and r is 0.

6. The composition of claim 1 wherein the one or more ionizable water solvatable monomers is selected from the group consisting of $M^1OC(O)$—C(R)=CH$_2$, $(R^1)_2N$-$L^{11}$-O—C(O)—C(R)=CH$_2$, $M^1OC(O)$-$L^{11}$-O—C(O)—C(R)=CH$_2$, $(M^1O)_{3-k}P(O)[-L^{11}$-O—C(O)—C(R)=CH$_2]_k$, $M^1OS(O)_2$-$L^{11}$-X—C(O)—C(R)=CH$_2$, $M^1OS(O)_2$-$L^{11}$-C(R)=CH$_2$, and $M^1OS(O)_2$—C(R)=CH$_2$, $M^1OS(O)$-$L^{11}$-C(R)=CH$_2$
wherein
R is hydrogen, Cl, F or CH$_3$;
$R^1$ is H or $C_1$-$C_6$ alkyl;
$M^1$ is a hydrogen or cation;
k is 1 or 2;
$L^{11}$ is a bond or an organic linking group having from about 2 to about 20 carbon atoms optionally interrupted by one or two hetero-radicals selected from the group consisting of —O—, —NR$^1$—, —S—, —SO—, —SO$_2$—, —N(R$^1$)C(O)—, and —OC(O)—, and optionally substituted with CH$_2$Cl.

7. The composition of claim 1 further comprising at least one additional monomer copolymerized in the following percentage by weight:
(d) from about 1% to about 35% vinylidene chloride, vinyl chloride, or vinyl acetate, or a mixture thereof; or
(e) from about 0.5% to about 25% of at least one monomer selected from the group consisting of styrene, methyl-substituted styrene, chloromethyl-substituted styrene, 2-hydroxyethyl (meth)acrylate, ethylenediol di(meth)acrylate, N-methyloyl (meth)acrylamide, $C_1$-$C_5$ alkyl (meth)acrylate, and a compound of formula (XX):

$$R^8(OCH_2CH_2)_mO—C(O)—C(R)=CH_2 \quad (XX)$$

wherein
m is 2 to about 10;
$R^8$ is hydrogen, a $C_1$ to $C_4$ alkyl, or $CH_2$=C(R)C(O)—O—; and
each R is hydrogen, Cl, F or CH$_3$; or
(f) from about 0.5% to about 10% of at least one monomer of formula (XXIa), (XXIb) or (XXIc):

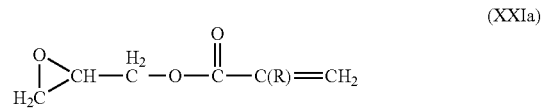

wherein
each R is independently hydrogen, Cl, F or CH$_3$;
$R^9$ is a linear or branched $C_1$ to $C_4$ alkyl;
$B^1$ is a divalent linear or branched $C_2$ to $C_4$ alkylene;
$B^2$ is a covalent bond or a divalent linear or branched $C_1$ to $C_4$ alkylene; and
X is —O—, —NR$^1$—, or —S—; wherein R$^1$ is H or $C_1$-$C_6$ alkyl; or
(f) 1% to about 35% of any combination of (d), (e), or (f).

8. The composition of claim 1 wherein the polymerizable nanoparticles are surface modified inorganic oxide particles comprising an oxide of M atoms independently selected from the group consisting of Si, Ti, Zn, Zr, Mn, Al, and combinations thereof; at least one particle having a surface covalently bonded to at least one group represented by formula (IV)

$$(L^2)_d(L^3)_cSi—(O)_e—(R^7)_f-(Z^1)_a-[C(X^1)]_x-(Z^2)_l-Q \quad (IV)$$

wherein:
$L^2$ is an oxygen covalently bonded to M; and each $L^3$ is independently selected from the group consisting of H, a $C_1$ to $C_2$ alkyl, and OH; d and c are each independently integers such that: d is greater than or equal to 1, c is greater than or equal to 0, and d+c is 3;
e, f, a, x, and l are each independently 0 or 1;
$R^7$ is $C_1$ to $C_{12}$ alkyl, linear or branched
$Z^1$ is —NH—;
$X^1$ is O or S;
$Z^2$ is NH, N—C(O)—OH, N—C(O)— or OCH$_2$CH$_2$N—C(O)— provided that when
$Z^2$ is N—C(O)— or OCH$_2$CH$_2$N—C(O)— that Q forms a 5 member heterocyclic ring represented by N—C(O)—CH=CH—C(O)—; and
Q is selected from the group consisting of a $C_2$-$C_{12}$ hydrocarbylene optionally interrupted by —O—C(O)—, —C(O)—O— or one divalent organic group.

9. The composition of claim 1 wherein the ethylenically unsaturated moieties are selected from the group consisting of (meth)acrylates, maleates, maleimides, fumerates, and unsaturated hydrocarbons including styrenes and substituted styrenes, vinyl, allyl and dienes.

10. The composition of claim 1 wherein the polymerizable nanoparticles comprise inorganic oxides of Si, Ti, Zn, Mn, Al, or Zr.

11. The copolymer composition of claim 1 wherein the polymerizable nanoparticles are inorganic oxides of Si.

12. The composition of claim 11 wherein the polymerizable nanoparticles are inorganic oxides of Si containing acrylate groups.

13. The copolymer composition of claim 1 wherein the polymerizable nanoparticles have an average particle size of from about 10 to about 500 nm.

14. A method of treating a fibrous substrate comprising applying to the surface of the substrate a fluoropolymer composition comprising monomers copolymerized in the following percentages by weight:
(a) from about 20% to about 95% of a fluoroalkyl monomer, or mixture of monomers, of formula (I)

   (I)

wherein
$R_f^1$ is a monovalent, partially or fully fluorinated, linear or branched, alkyl radical having from about 2 to about 100 carbon atoms; optionally interrupted by 1 to about 50 oxygen atoms; wherein the ratio of carbon atoms to oxygen atoms is at least about 2:1 and no oxygen atoms are bonded to each other;

L is a bond or a linear or branched divalent linking group having 1 to about 20 carbon atoms, said linking group optionally interrupted by 1 to about 4 hetero-radicals selected from the group consisting of —O—, —$NR^1$—, —S—, —SO—, —$SO_2$—, and —$N(R^1)C(O)$— wherein $R^1$ is H or $C_1$ to $C_6$ alkyl, and said linking group optionally substituted with $CH_2Cl$;

X is —O—, —$NR^1$—, or —S— wherein $R^1$ is H or $C_1$ to $C_6$ alkyl;

R is hydrogen, or $CH_3$;

(b) from about 5% to about 80% of at least one of:
(i) an alkyl (meth)acrylate monomer having a linear, branched or cyclic alkyl group of from about 6 to about 18 carbons; or
(ii) one or more ionizable water solvatable monomers; and (c) from about 0.05% to about 2% polymerizable non-fluorinated nanoparticles, wherein the polymerizable nanoparticles have ethylenically unsaturated moieties linked to the particle, said composition providing oil repellency and water repellency to substrates contacted therewith.

15. The method of claim 14 wherein the fluoropolymer composition has a concentration of from about 5 g/L to about 100 g/L in water.

16. A fibrous substrate treated according to the method of claim 14.

17. The substrate of claim 16 which is woven and non-woven fibers, yarns, fabrics, fabric blends, textiles, nonwovens, paper, leather, rugs and carpets.

* * * * *